Figure 2:
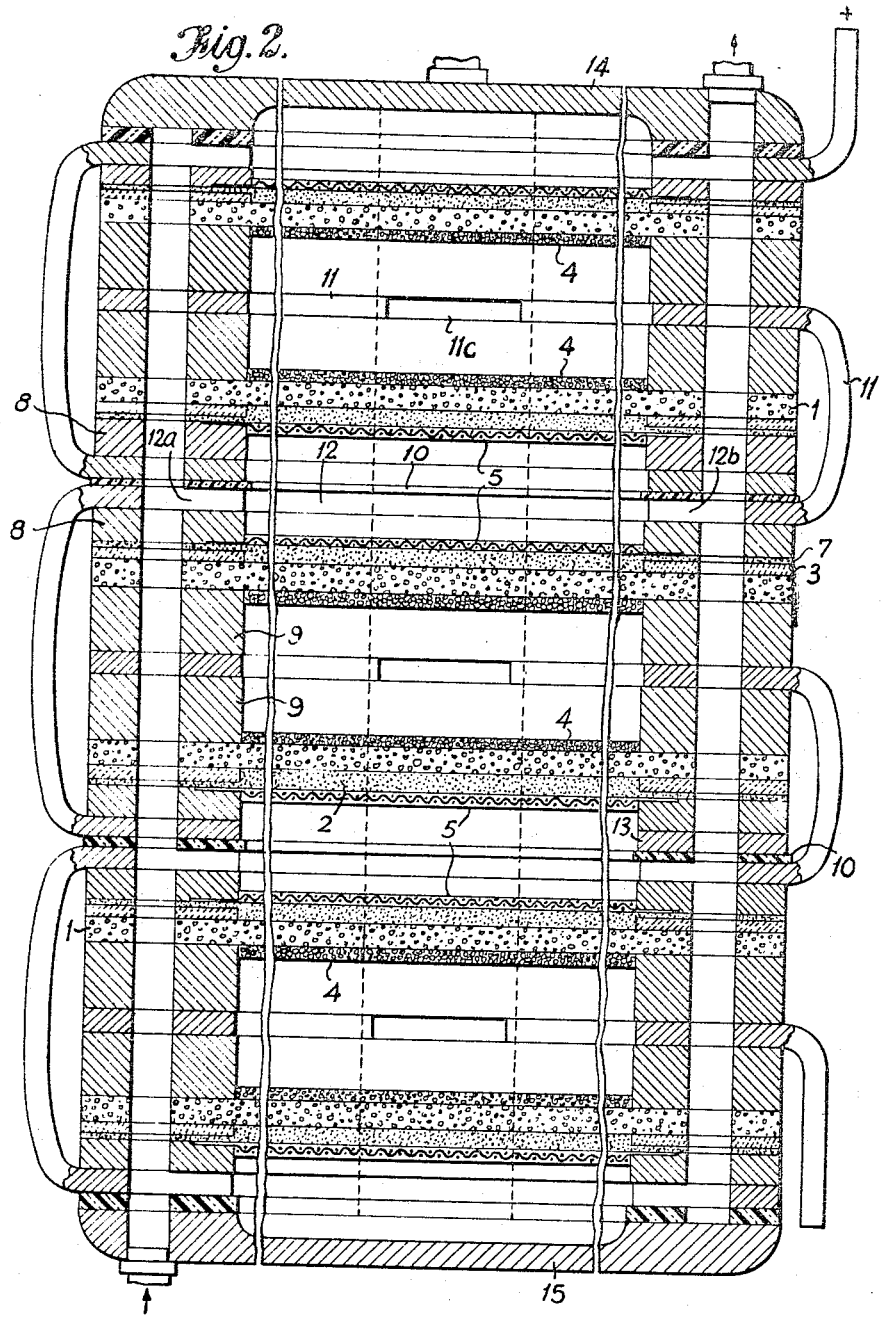

July 18, 1967           J. M. JENKINS           3,331,706
BATTERY OF FUEL CELLS
Filed July 27, 1964           2 Sheets-Sheet 1
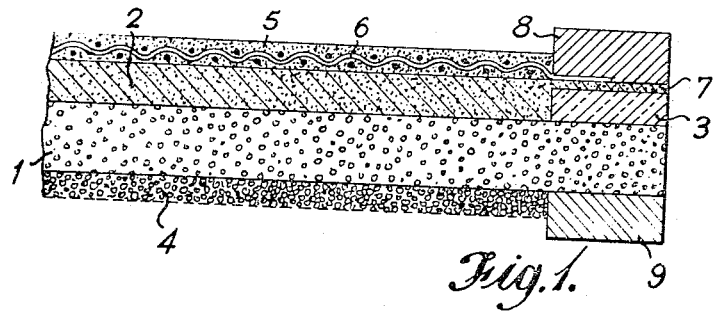
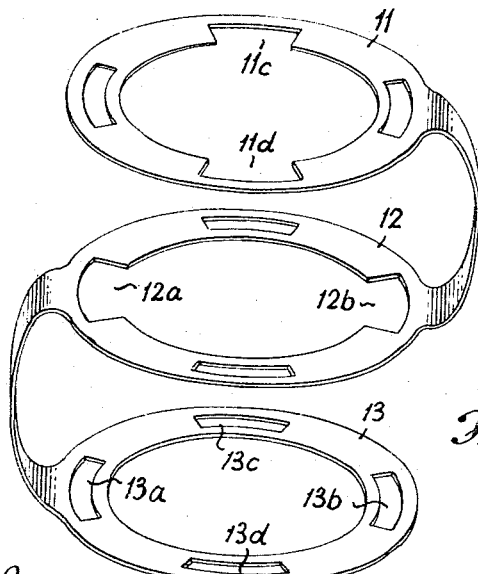
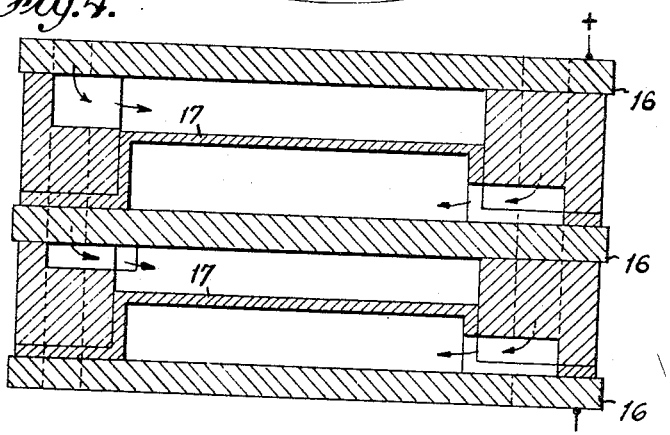
Inventor:
Jonathan Mowbray Jenkins
By Kenyon, Palmer, Stewart
& Estabrook,
Attorneys

United States Patent Office 3,331,706
Patented July 18, 1967

3,331,706
BATTERY OF FUEL CELLS
Jonathan Moubray Jenkins, East Horsley, England, assignor to Energy Conversion Limited, London, England, a British company
Filed July 27, 1964, Ser. No. 385,270
Claims priority, application Great Britain, July 26, 1963, 29,739/63
3 Claims. (Cl. 136—86)

This invention relates to fuel cells of the kind in which the electrodes of a cell are in contact with an electrolyte body which, at least in the operating condition of the cell is in the form of a solid or semisolid matrix with liquid electrolyte in interstices of the matrix. For convenience such a cell will hereinafter be called a "solid electrolyte cell."

A number of proposals have been made for solid-electrolyte fuel cells, and the electrolyte body has usually been in the form of a self-supporting mass of ceramic material, such as compacted powdered alumina, or oxide or an alkaline earth metal, which is impregnated with an electrolyte which may be solid at room temperature but which fuses at a temperature below the operating temperature of the cell in which it is used. In such prior proposals, however, the electrolyte body has been formed in such proportions and of such rigidity as to provide the major structural support for the cell, the form and structure of the electrodes being merely considered from the point of their function to bring about the desired electro-chemical reaction in the cell.

The fundamental strengths of the matrices of such electrolyte bodies under operating conditions are such that the bodies have had to be of appreciable thickness, especially when the area of the electrodes is large, or some additional supports have been, or would be necessary. In consequence, the equivalent power density, that is the power developed by the cell for unit volume of the cell, has had to be lower than is desirable for economic reasons, and it is an object of the present invention to enable a cell to be designed which will yield a more economic power density.

In a unit for a solid electrolyte fuel cell, in accordance with the invention, a fine pore element is provided which is impregnated with electrolyte that is liquid at least at the operating temperature of the cell and said fine pore element is capable of bearing the load of other parts of the cell carried and/or superposed thereon. Thus said element will bear an adherent layer forming the said electrolyte body, and superposed thereon will be an electrode member which may be of any suitable conducting, or semi-conducting material, while one side of the element will have applied thereto a layer of conducting material of coarse porosity which will form at least part of the second electrode of the cell and will enable reactant gas supplied to the electrode to come into contact with electrolyte at the face of the fine pore element without loss of electrolyte therefrom. Said coarse pore layer need, however, only be adherent to the impregnated fine pore element. The fine pore element may be, and preferably is, metallic, thus forming another part of the second electrode, but in an assembly of fuel cells embodying the invention, the fine pore elements, be they metallic or not, provide structural supports for the individual units. These fine pore elements may be formed conveniently from nickel sheet of suitable porosity and pore size, which may be produced by rolling operation from sintered nickel power aggregate.

Since there is no necessity for the presence of substantially greater thickness of matrix than is required to ensure adequate separation of the electrodes, the amount of matrix in the cell may be such as to make the overall thickness of the cell small, and it is proposed in accordance with one aspect of the invention that a cell capable of yielding approximately 25 kw. per cu. ft. should have a thickness of the order of only tens of thousandths of an inch. The overall thickness of the electrolyte body, of both electrodes and of the load-bearing element, in a cell unit in accordance with the invention may be so small that each unit need be only a matter of, say 0.050 in. thick.

In one construction of cell embodying the invention, a rolled sintered nickel sheet having fine pores (4–5$\mu$) and a porosity of approximately 35–40 percent and of thickness 0.070 in. is impregnated with lithium carbonate/sodium carbonate eutectic electrolyte. This may be effected by lowering the nickel sheet under vacuum conditions into molten electrolyte at about 600° C. and raising it again after allowing the temperature of the impregnant to fall to 550° C. in about half an hour. When this is cooled, a slurry of approximately 50/50 (w./w.) magnesia and the eutectic electrolyte in toluene is applied to, or the mixture is flame sprayed onto, one side of the impregnated sheet. To the other side of the nickel sheet a backing of coarse pore nickel or nickel/silver is applied, for example, by means of a paste or by spraying, and the sheet, if necessary, may be fired at, say, 550° C. for a short time to consolidate the impregnating materials and to fix, or help to fix, the coarse pore layer in position. It should be noted that, because the impregnation of the fine pore sheet forms a gas barrier, the resultant layer of electrolyte body, in the form of the coating on the impregnated electrode, need not be 100 percent dense, nor need it be more than about 0.010 in. thick.

The electrolyte body is then coated with a zinc oxide/silver electrode material to provide the other electrode, a metal (preferably silver) gauze being arranged in conjunction with this electrode material, whether embedded in the material or within either face of it, to act as a current collector. The thickness of this electrode with the collector may be less than 0.010 in Cadmium oxide is an alternative electrode material, and other materials will be apparent to those skilled in this art.

The unit thus completed may be of no greater thickness than 0.030 in. and should be capable of use in a cell yielding up to 25 kw. per cu. ft. For use in a fuel cell, of course, the units are best suited for assembly in series arrangement as a battery, each unit being spaced from the next by gas-tight spacers through which access is provided for the appropriate reactant gas. The spacers preferably form the current collectors for each cell, and, by arranging to connect in a series of parallelled pairs, the spacers between every other unit being split and the parts insulated from each other, there is no necessity for any gas separator between the units. It will be appreciated that, even if such separators may be of only foil thickness, obviating the necessity for these decreases the gas volume and reduces the overall size of the assembly; moreover, fewer gas passages are required.

An assembly of units of this nature would be clamped together, suitable series-paralleling connections being provided.

It is evident that it may be preferable to arrange that the flow of fuel gas in a battery of units in accordance with the invention, may be in series through up to, say, 4 units, separate inlets and outlets being provided to each group of units. On the other hand, if air is the oxidant gas, it will be advantageous for the spent air to pass out of each cell, and preferably straight to atmosphere; and in that case the air inlet to all cells may be parallel. Extra spacers for coping with such air or gas distribution may be needed at intervals in the stack of units. Alternatively the series-paralleling connections may be adapted for this purpose.

Depending upon the loading of the cell, there may be considerable heat generated in the battery which will be required to be dissipated. For this reason, spacers, for example, may be provided with extensions forming cooling surfaces, or the connecting portions themselves of the spacers may serve this purpose.

It will be understood that the general plan shape of the cell units need not be only circular; they may, for example, be alternatively of square or rectangular shape. Furthermore, they need not necessarily be planar since it may be advantageous in certain cases that they should be of curved form in section.

Two embodiments of the invention will now be described by way of example with reference to the accompanying drawings, of which FIGURE 1 is a diagrammatic representation of a cell unit and FIGURE 2 shows a bi-cell battery assembly of such units, FIGURE 3 showing a proposal for the shape of a composite spacer for an assembly such as is shown in FIGURE 2. FIGURE 4 is a uni-cell battery assembly of the units shown in FIGURE 1.

In FIGURE 1 of the drawings, an element 1 formed as a disc from a 0.010 in. thick rolled sintered nickel porous sheet (35–40 percent porosity and, so-called 4–5$\mu$ pore size), is impregnated, as described above, with a eutectic composition of lithium carbonate and sodium carbonate. On to one side of this impregnated disc is sprayed a layer 2 of a mixture of magnesia and the eutectic composition in proportion of 50:50 (weight) to a thickness approximating to 0.010 in., an annular portion of this side of the element having been sprayed with alumina 3 up to a thickness just less than the required thickness of the layer 2. This annulus of alumina assists in retaining the electrolyte in the layer 2 after it has become molten in operation of the cell. A layer 4 of coarse nickel/silver powder, also about 0.010 in. thick, is then applied and sintered to the other side of the disc 1. Layer 5 is a silverised zinc oxide electrode of the kind described in British patent specification No. 808,591, and this is provided with a current collector 6 of silver gauze, this collector being situated either within the layer 5 itself, as shown, or at one or other of the faces of the layer. The edge of the gauze 6 is trapped in a thin layer of the magnesia/eutectic mixture between a conductive ring 8, for example, of steel, and the layer of alumina 3. In this way, conductive connection is made between the electrode 5 and the conductor 8, which latter therefore acts as a terminal for the cell, and at the same time a positive gas seal is made between this conductor and the alumina layer 3.

A second conductive ring 9, for example, of steel, in contact with the electrode layer 4 forms the other terminal of the cell, and in assemblies where such cells are arranged in series, or in parallel or, of course, in series-parallel, connection, the terminals 8 and 9 serve to provide, or to assist in providing, gas spaces between adjoining cells. In some designs of cell in accordance with the invention it may be found advantageous to weld an annulus, such as will form the terminal 9 of the cell, to the disc 1 in the first place; this construction provides reinforcement and increased rigidity and serves to counteract any tendency of the disc 1 to buckle during the subsequent processing. While such stiffening of the disc may not prevent a certain amount of doming, this need not be disadvantageous and the rigid rim also may assist in reducing thermal shock of the structure in operation.

When one of these cells is operated singly, air or oxygen is supplied to a gas chamber formed by a blanking-off member (not shown) applied to the member 8 while hydrogen may be led into a gas chamber formed by a second blanking-off member (also not shown) applied to the member 9. However, in a battery of cells, the cells may be arranged as shown, for example, in FIGURE 2.

In FIGURE 2, cells are arranged as parallelled pairs in series and the air, or oxygen, chamber, is the space bounded by two positive electrodes 5, the inside edges of two terminal spacers 8 and, because insulating layers 10 have to be provided between electrodes of similar polarity in adjacent pairs of cells arranged back-to-back, the oxygen or air space is further bounded by the inside edge of the layer 10. This layer 10 need not, however, be of great thickness and may be of the order of only a few thousandths of an inch thick. Each fuel gas space is bounded by two electrodes 4 and the inside edges of the two associated terminal spacers 9. In addition, each air or oxygen space and fuel gas space is bounded by the inside edges of contact members to be described later.

In a battery of cells, arrangements have to be made for the gases to be fed to the respective gas spaces and this may be effected, in this case, in a known manner, by providing aligned holes in each of the stacked parts of the battery. In this way, each gas may be led from one end of the battery into each cell along one set of aligned passages and the outflow of each gas from the cells may be led into another of the aligned passages. Inflow and outflow from the respective aligned passages is made through the contact members provided for the necessary interconnections between the cells. These contact members may be separate pieces welded, or otherwise electrically connected, together appropriately but, to avoid difficulty in making such connections, such difficulty being particularly acute with the very thin, foil-like connectors involved, it is preferable to provide composite connectors which themselves provide the interconnections. Indeed it is possible to arrange for all the necessary interconnections between adjacent pairs of cells to be made with a connector of the form shown in FIGURE 3.

In the following description, although reference is made to the construction of contact shown in FIGURE 3, it will be understood that the same considerations apply to individual contact members which are to be subsequently interconnected. It should be borne in mind, too, that the interconnections are in effect shown purely diagrammatically and the gas flow arrangements, in flow or reverse flow, may be provided otherwise than is shown.

The contact 11 is intended to be arranged between two adjoining fuel electrode terminals 9 of one pair of cells, the contact 12 between the air electrode terminal 8 of the next cell of the adjoining pair and the insulator 10 between the two pairs, while contact 13 lies between the air electrode terminal 8 of the lower of this first-mentioned pair and the said insulator 10. (For the construction shown in FIGURE 2, the spacing between contacts 12 and 13 will be approximately double that between contacts 11 and 12.)

It should be noted however that the looped shaping of the connector may be formed during the stacking of the cells to provide the battery.

The air or oxygen passages through the stack are typified by the passages marked 13a and 13b in the contacts 13, while the fuel gas passages are typified by the passages marked 13c and 13d. It will be understood that each of the other items in the stack are formed with the same passages as in contact 13, and the gases are passed into and from the cells through cut-outs in contacts 11 and 12 respectively. The holes forming the passages in each of the items may be formed by simple stamping operations.

Air or oxygen is led into each of the cells through the cut-away portion 12a and the gas is circulated out of the cell through cut-away portions 12b. Similarly fuel gas is fed into each cell through cut-away portions 11c, and circulated out of the cells through cut-away portions 11d.

In the cases of each end cell in the stack, closure plates 14 and 15 are required to form suitable gas spaces for the outer electrodes of these two cells; and connections to each of the gas spaces may be made through one or other of these closure plates. Any pressure necessary between the units of the stack, for the purpose of providing gas-tightness, may be applied between these closure plates. If the stack is too thick for single passes, it may be necessary to make arrangements for gas circulation to be through unit groups of cells, and for gas inlets and outlets to be provided at intervals along the stack; additional spacers may be necessary for this purpose.

The overall dimensions of the cells and spaces will depend upon the electrical output which is expected to be derived, but it will be observed that the construction according to the invention provides a compact arrangement which can be robust at the same time.

In the arrangement described with reference to FIGURE 2, it is necessary to provide the parallelling and series interconnections between the cells. If the cells are stacked in series, there is no necessity for such interconnections, but it becomes necessary for the gas spaces between the cells to be separated, it being required to supply different gases to the adjoining electrodes which are of opposite polarity.

In FIGURE 4, a construction suitable for such series operation of cells 16 is shown. Here the gas separators 17 are formed from foil shaped to provide the two gas chambers and the gas passages in the terminal spacers are cut away to provide the appropriate gas inlet and outlet passages to the gas chambers of each cell. Obviously arrangements for sectionalising the battery, similar to those mentioned for the serial/parallel construction may be made for this construction, if desired, to meet heat dissipation conditions and/or gas-carrying capacity requirements.

It will be understood that the construction described above may be varied considerably without parting from the spirit of the present invention, provided that the essential feature of the porous electrolyte-impregnated support plate is retained. It is possible, however, even for this plate to take a different form from that described. Thus the plate need not be conducting and may comprise, for example, a porous ceramic plate. It is doubtful however, that a plate, other than metallic, can be strong enough to provide the required strength when its thickness is reduced to the proportions of the constructions specifically described above; but having to provide a somewhat thicker base member need not detract from the value of the invention in this case.

I claim:
1. A battery of fuel cells of the kind having an electrolyte body which, at least at the operating temperature of the cell, is in the form of a solid, or semi-solid matrix with liquid electrolyte in interstices of the matrix, each electrolyte body comprising a fine pore element impregnated with electrolyte that is liquid at least at the operating temperature of the cell, said fine pore element being capable of bearing the load of other parts of the cell carried and superposed thereon, said body having electrodes on the opposite sides of said element, electrical connections being provided between said cells, some of said connections connecting said cells in paralleled pairs arranged back-to-back, insulating means arranged to insulate each pair of cells from the next, others of said connections connecting said paralleled pairs of cells each in series with the next, separators between each of said elements, said separators permitting an appropriate gas space behind each electrode, said elements, said separators, said insulating means and said connections being provided with matching gas ports, said impregnated elements themselves forming the barrier between adjacent gas spaces, and each said element being supported substantially only at its perimeter between pairs of said separators.

2. A battery of fuel cells as claimed in claim 1, wherein connectors of looped form provide said interconnections.

3. A battery of fuel cells as claimed in claim 2, wherein each said connector is of one-piece double-loop form and is adapted to provide the paralleling connection between paralleled cells and the series connections between adjacent paralleled pairs of cells.

References Cited

UNITED STATES PATENTS

| 409,366 | 8/1889 | Mond et al. | 136—86 |
| 3,068,311 | 12/1962 | Chambers et al. | 136—86 |
| 3,188,242 | 6/1965 | Kordesch et al. | 136—86 |
| 3,202,546 | 8/1965 | Rightmire et al. | 136—86 |

ALLEN B. CURTIS, *Primary Examiner.*

WINSTON A. DOUGLAS, *Examiner.*